United States Patent
May

(10) Patent No.: US 7,395,899 B2
(45) Date of Patent: Jul. 8, 2008

(54) METHOD AND APPARATUS FOR REACHING FROM OUTSIDE AN UPPER LEVEL OF A TALL STRUCTURE

(75) Inventor: Marvin M. May, Los Angeles, CA (US)

(73) Assignee: Exterior Elevator, LLC, Los Angeles, CA (US)

( * ) Notice: Subject to any disclaimer, the term of this patent is extended or adjusted under 35 U.S.C. 154(b) by 28 days.

(21) Appl. No.: 10/763,596

(22) Filed: Jan. 23, 2004

(65) Prior Publication Data

US 2004/0154869 A1 Aug. 12, 2004

Related U.S. Application Data

(60) Provisional application No. 60/442,265, filed on Jan. 27, 2003.

(51) Int. Cl.
*A62B 1/00* (2006.01)
*B66B 9/00* (2006.01)

(52) U.S. Cl. ........................ 182/142; 187/239

(58) Field of Classification Search ............... 182/142, 182/10, 11
See application file for complete search history.

(56) References Cited

U.S. PATENT DOCUMENTS

| | | | | | |
|---|---|---|---|---|---|
| 249,847 | A | * | 11/1881 | Macdonald | 182/10 |
| 276,090 | A | * | 4/1883 | Sperry | 182/50 |
| 349,870 | A | * | 9/1886 | Woodward | 182/11 |
| 356,436 | A | * | 1/1887 | Anderson | 182/43 |
| 390,445 | A | * | 10/1888 | Bruce | 182/142 |
| 640,099 | A | | 12/1899 | Cotter | |
| 734,230 | A | * | 7/1903 | Hillier | 182/10 |
| 1,069,088 | A | * | 7/1913 | Taylor | 182/230 |
| 3,519,248 | A | | 7/1970 | Kushiro | |
| 3,750,686 | A | | 8/1973 | Cook | |
| 3,967,699 | A | | 7/1976 | Jasch | |
| 4,111,281 | A | | 9/1978 | Jacobs | |
| 4,209,077 | A | | 6/1980 | Yui et al. | |
| 4,318,533 | A | * | 3/1982 | Port | 254/273 |
| 4,355,699 | A | | 10/1982 | Smith, Jr. | |
| 4,406,351 | A | | 9/1983 | Littlejohn et al. | |
| 4,424,884 | A | | 1/1984 | Smith, Jr. | |
| 4,469,198 | A | | 9/1984 | Crump | |
| 4,502,570 | A | * | 3/1985 | Westerlund | 187/264 |
| 4,512,438 | A | * | 4/1985 | Vilchek et al. | 182/43 |

(Continued)

OTHER PUBLICATIONS

PCT International Search Report (dated Nov. 8, 2006)—International Application No. PCT/US04/02243—International Filing Date Jan. 26, 2004 (13 pages).

*Primary Examiner*—Alvin C Chin-Shue
(74) *Attorney, Agent, or Firm*—Blakely, Sokoloff, Taylor & Zafman, LLP

(57) ABSTRACT

An embodiment of the invention is directed to a system having a pulley attached to a building. A closed loop of cable is installed around the pulley. The loop is of sufficient length so as to reach, when deployed outside of the building, below the pulley to where emergency personnel gather in an area next to a base of the building (when responding to a disaster situation in the building). A winch around which the loop is to be operatively installed is located in the area next to the base. Other embodiments are also described and claimed.

6 Claims, 16 Drawing Sheets

U.S. PATENT DOCUMENTS

| | | |
|---|---|---|
| 4,830,141 A | 5/1989 | Montaigne |
| 4,919,228 A | 4/1990 | Stefan |
| 5,090,666 A | 2/1992 | May |
| 5,253,734 A | 10/1993 | Laurutis |
| 5,280,879 A * | 1/1994 | Kreuter ................. 254/333 |
| 5,355,975 A | 10/1994 | Laurutis |
| 6,079,520 A | 6/2000 | Black et al. |
| 6,364,063 B1 * | 4/2002 | Aulanko et al. ............. 187/266 |
| 6,435,595 B1 * | 8/2002 | Chenowth .............. 296/100.13 |
| 2005/0109724 A1 | 5/2005 | Frumau et al. |

* cited by examiner

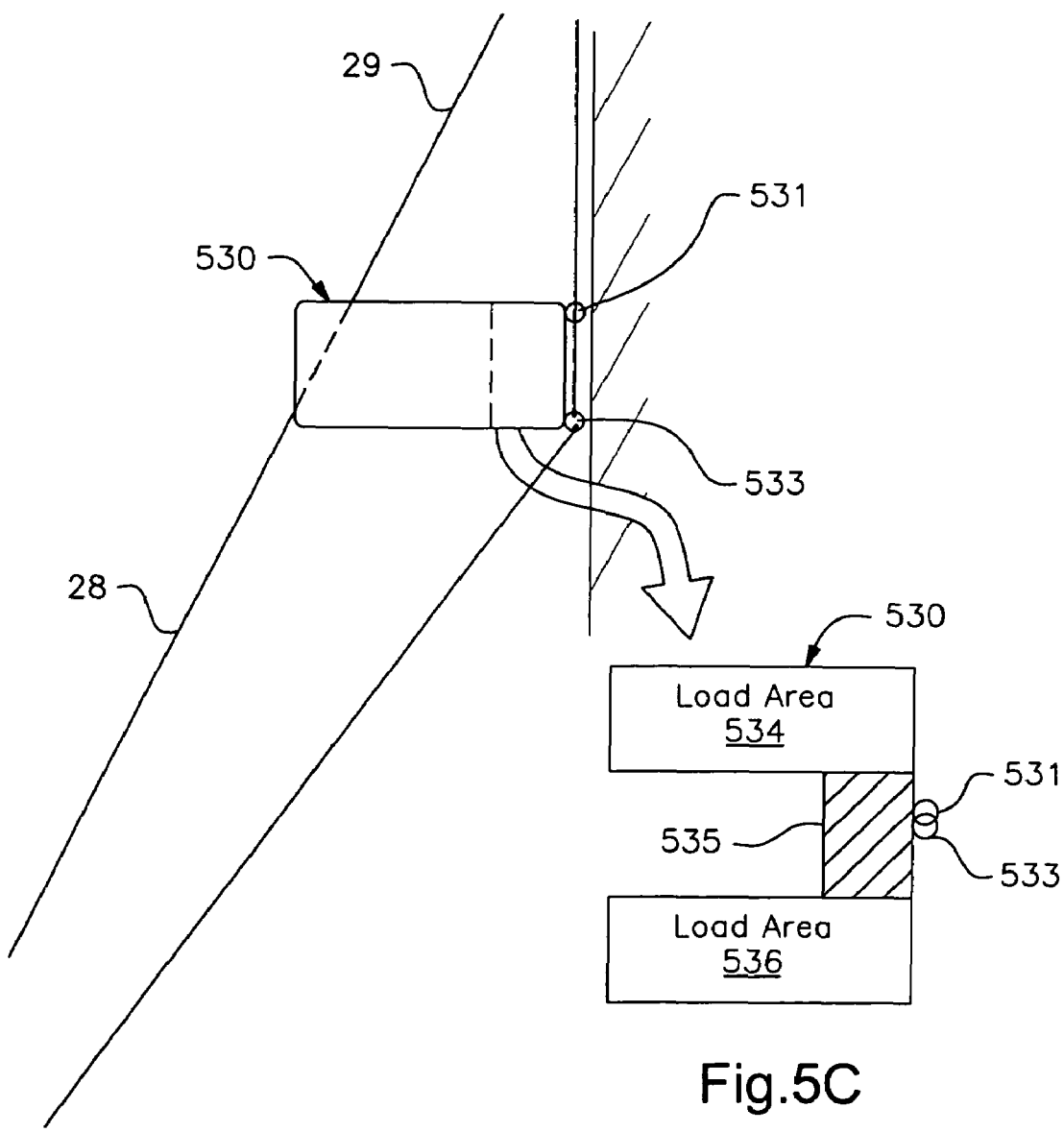

METHOD AND APPARATUS FOR REACHING FROM OUTSIDE AN UPPER LEVEL OF A TALL STRUCTURE

This application claims the benefit of the earlier U.S. filing date of Provisional Application No. 60/442,265, filed Jan. 27, 2003.

BACKGROUND

An embodiment of the invention is generally related to raising firefighters and equipment to, and evacuation of people from, the upper floors of a multi-story building during an emergency such as a fire. Other embodiments are also described.

When an emergency or disaster situation occurs in a tall structure such as a multi-story building, emergency personnel (such as firefighters and paramedics) are called to alleviate the disaster or rescue people trapped in the building. Nowhere has this been more horribly exemplified than at the World Trade Center towers in New York City, on Sep. 11, 2001. In that case, people were trapped in the upper floors of the buildings because of fires raging in lower floors. In addition, the emergency stairwells had become filled with smoke and hazardous gasses or had been rendered completely impassible due to debris. Although there were also people on floors below the fires, some of them might not have been able to walk down the emergency stairwell because they were injured. In short, there was a need for massive evacuation from and assistance to all of these upper floors. The term "upper floors" here is intended to mean those portions of a multi-story building that are above a base (e.g., the ground floor) of the building.

Because most of the upper floors were too high to be accessed from outside of the building using conventional firefighter ladders, emergency personnel had to walk up hundreds of flights of stairs (elevators are typically automatically shut down when there is a building fire). To make things worse, they had to battle the heat and smoke on the way up through the stairs, while carrying relatively heavy equipment such as oxygen bottles, medical kits, and other equipment needed to alleviate the disaster or assist the injured. Their progress up the stairs unfortunately was too slow in view of the rate at which the fires were consuming the building. Some of the emergency personnel may even have suffered heart attacks or smoke inhalation injuries while climbing the numerous stairs. It is possible that some of the evacuees, particularly those in the top most floors near the roof, might have been rescued from the building by an emergency helicopter that could land on the roof. However, this would still leave a significant number of people with no choice but to jump out of a window of the building to their deaths, rather than be burned alive or asphyxiated by the raging fires.

There have been several systems disclosed for use in rescuing persons trapped in the upper floors of a multi-story building. See, e.g. U.S. Pat. Nos. 4,209,077; 4,919,228; 4,355,699; 4,424,884; and 4,406,351. Some of these systems use a platform or gondola that is suspended alongside an exterior face of the building by a cable. The platform is raised or lowered to a desired location next to an upper floor. Persons are then evacuated from that floor, and the platform loaded with the evacuees is then lowered to a safe haven (typically on the ground next to the building). However, these systems might suffer from a number of problems, including a relatively high cost of manufacture or maintenance as well as complex operation.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

FIGS. 5B and 5C depict another example container for the system.

DETAILED DESCRIPTION

Figure 1:
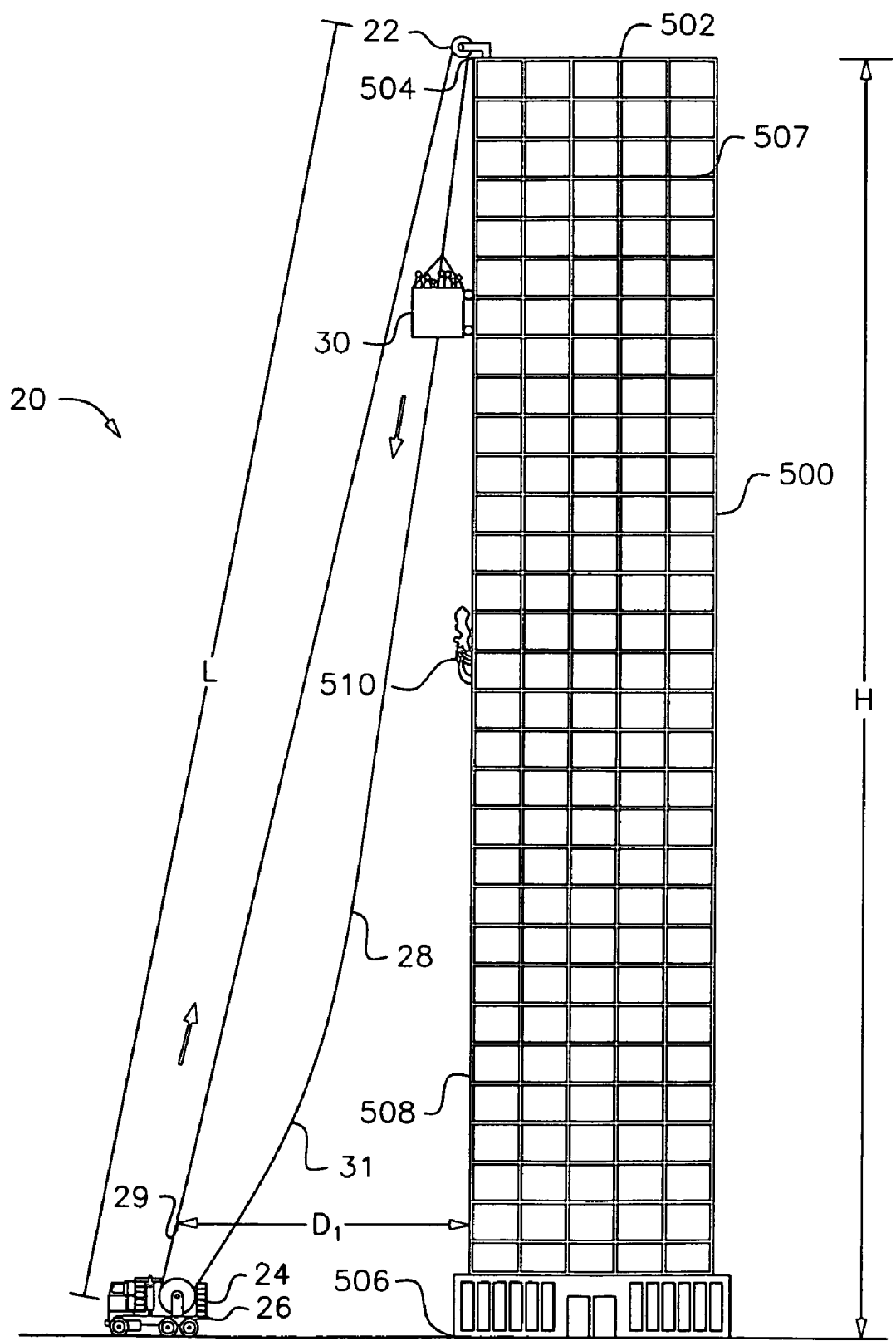
FIG. 1 is a conceptual diagram depicting a side elevation view of an embodiment of a system for reaching an upper floor of a multistory building.

According to an embodiment of the invention, a system and method are described for reaching from outside an upper floor of a multi-story building, that is believed to be more cost efficient and effective. This system may include a closed loop of cable that is installed around a pulley which is located at a roof or somewhere above an upper floor of the building. The loop is at least long enough to reach an area next to a base of the building (when allowed to hang outside of the building). The loop is to be installed into a winch preferably located in the area next to the base of the building. The loop of cable is preferably of such length as to render both a far portion and a near portion of the loop (relative to the building) under tension once the loop has been properly installed into the winch and the winch has been correctly located relative to the building. In operation, a load is attached to the loop in the area next to the base of the building. Then, the winch is activated to raise the attached load until it has reached and is suspended at a desired level that is near the same level as an upper floor of the building.

While the load is suspended by the loop with the winch being inactive, the load may be moved closer or farther to the building, by any one of several techniques. For example, the winch may be moved either upwards or towards the building, to position the suspended load closer to the building for easier access into or from the building. This may be done by moving a vehicle at the base of the building, and to which the winch is anchored, horizontally closer to the building. Alternatively, the winch may be moved upward relative to the vehicle, while the vehicle remains still. Yet another alternative is to cause one or more moveable pulleys around which the loop is installed to move, while keeping the winch inactive and still, to release some slack in the loop and thereby allow the suspended load to move closer to the building. Other ways of changing the tension in the near portion of the loop below the load may alternatively be used to perhaps decrease the tension and thereby move the suspended load closer to the building.

The load may include a container, such that people may be evacuated from the upper floor by being accepted into the container (while the container is suspended at approximately the upper floor). Once the container has been loaded, it may be moved away from the building, prior to lowering the evacuees to a haven (e.g., the area next to the base of the building) by activating the winch in its opposite direction. For example, the winch may be moved either downwards or away from the building, to back the suspended load away from the building. This may be done by moving the vehicle at the base of the building, to which the winch is anchored, horizontally further from the building. Alternatively, the winch may be moved downward relative to the vehicle, while the vehicle remains still. Yet another alternative is to cause one or more moveable pulleys around which the loop is installed to move, while keeping the winch inactive and still, to take up slack in the loop and thereby pull the suspended load farther away from the building. Other ways of changing the tension in the near portion of the loop below the suspended load may alternatively be used to perhaps increase the tension and thereby move the suspended load farther from the building.

One or more of the embodiments of the invention described here may also be used to effectively and quickly raise various types of emergency equipment, such as fire fighting equipment, air and water hoses, heavy equipment and emergency electric power, to the upper floors of the building. As a result, firefighters need no longer carry them up a stairwell of the building. This also helps reduce traffic congestion and load on the stairwell, while at the same time providing more fire fighting equipment to the disaster site.

Although the system is expected to be particularly useful for moving firefighters and equipment upward, and evacuating occupants from relatively high building levels that are beyond the reach of ladder trucks, the system may also prove to be useful for lower height buildings (and particularly those without sprinkler systems). That is because it may have the capability to lift and lower larger loads than can existing ladder systems. In addition, evacuees may be handled much easier than on a ladder. Disabled persons and hospital patients may also find it easier to use a container basket or gondola, rather than a ladder.

The logistics of certain embodiments are relatively straight forward yet adaptable. For instance, a relatively low installation cost is incurred by the building owner, primarily due to the pulley (and its attachments to the building) and the loop of cable. The winch is preferably to be mounted on conventional Fire Department vehicles or a standard truck. In addition, there is also the benefit of being able to use the system to hoist and deposit non-emergency equipment to any upper floor (which may not be practical using the built-in elevator system of the building). There may be additional advantages or benefits to using the system, including some that will be further discussed below.

Referring to FIGS. 1-3A, these figures illustrate side elevation and front elevation views of a system 20 for accessing an upper floor 507 of a multi-story building 500. The building 500 has a roof 502 having an edge 504, a base 506, and a face or side 508 on which flames 510 are raging. The roof 502 as used here may be the actual roof of the building 500, or any other conventional location near the top of the building 500. The base 506 may be at ground level, another level near ground level, or any other level next to which there is an area where emergency equipment and personnel can gather when responding to a disaster situation in the building (e.g., the roof of another, adjacent building—not shown).

A pulley 22 is mounted, in this embodiment, on the roof 502 near the edge 504. An alternative would be to attach the pulley to somewhere on the building above an upper floor. The distance between the pulley 22 and the base 506, along a vertical, is indicated as the height, H. Various ways of attaching the pulley to the building will be described below.

The system 20 also has a winch 24 which is preferably disposed in an area next to the base 506 of the building, as shown. The winch 24 may alternatively be located near the top of the building (instead of near the bottom) with the pulley near the bottom. Upon activation (e.g., the application of motor power), the winch 24 can selectively rotate in a first direction or an opposite second direction. In a preferred embodiment, the winch 24 is anchored or secured to a vehicle 26 as shown, which may be a Fire Department truck, that is horizontally moveable toward and away from the building 500. Alternatively, the winch 24 may be installed so as to move horizontally or vertically in other ways, such as on a track or on an inclining ramp. For instance, such a track might be located on an adjacent building or structure, instead of on the ground as shown. As will be explained below, a reason for making the winch horizontally or vertically moveable is to allow a suspended load in the system to be moved a) away from a side of a building for clearance while being raised or lowered, and b) closer to the building for easier loading and unloading from the upper floor. Other ways of moving the suspended load towards and away from the side of the building include the embodiment of the invention depicted in FIGS. 4A-4C (to be described below).

The system also features a closed loop of cable 28 that is connected around the pulley 22 and the winch 24. The cable may be a wire rope, rope, chain, line, or the like, which is of sufficient strength to suspend the intended load that will be attached to the cable, e.g. evacuees and related emergency personnel and equipment. The loop of cable 28 is of sufficient length so as to reach, when deployed outside of the building as shown, below the pulley to where emergency personnel gather in an area next to the base 506 of the building when responding to a disaster situation in the building. For example, the total length of the closed loop may be about twice the height H for the embodiment of FIG. 1, that is, a little more than twice the height H to allow for distance D1 as shown in FIG. 1. In the preferred embodiment, the loop of cable 28 is connected exactly once around the pulley 22 as shown, and exactly once around the winch 24. In other words, neither the pulley 22 nor winch 24 have multiple wrappings of the loop of cable 28. Alternatively, however, more than one wrap of the cable may be used around the pulley or winch. Since, in many cases, the total length of the loop of cable 28 is determined by the height of the building 500, different buildings with different heights may generally require loops having different lengths.

The system 20 shown in FIG. 1 further includes, in this embodiment, a container 30 designed for holding people and equipment and is connected to a near portion 31 of the loop of cable 28. This container may be a platform with a collapsible net, a basket (shown), a cage, a gondola, a module, or any other structure that may be used to transport evacuees, emergency personnel, or equipment to and from an upper floor of the multi-story building 500. If more than one container is to be used simultaneously in the system, they are preferably contra-positioned along the loop of cable 28, such that while the container 30 is moving toward the roof 502 (e.g., to assist evacuees), another container 32 connected to a far portion 29 is simultaneously moving toward the base 506 (e.g., to deliver evacuees to safety). See FIG. 3B for such an example. As an alternative, this system may be operated with just a single container 30, at a lower cost of operation and deployment.

Figure 2:
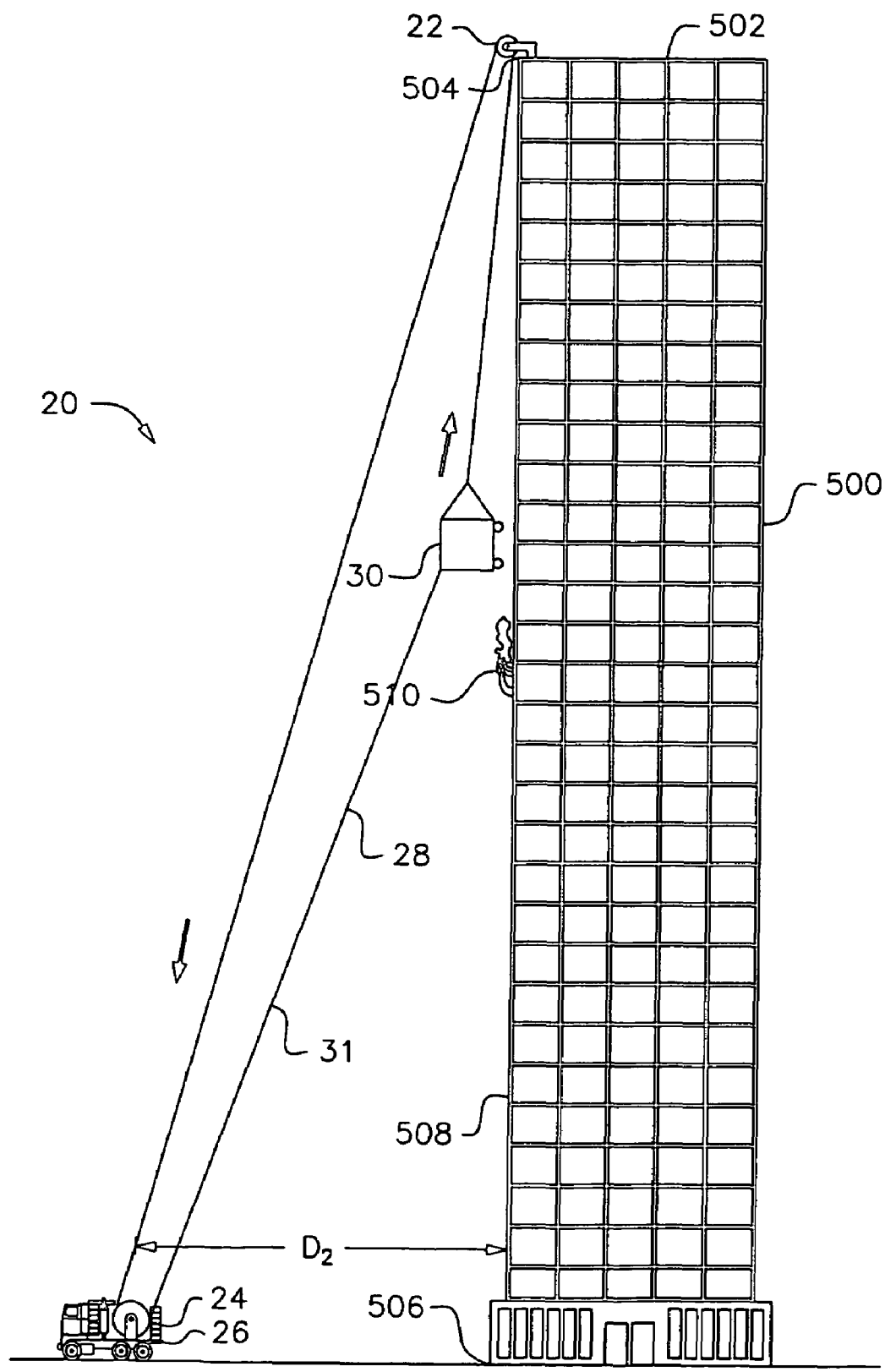
FIG. 2 is a conceptual diagram of another configuration of the embodiment of the system in FIG. 1.

FIGS. 1 and 2 illustrate two different instances of the system as it is operating. In FIG. 1, the winch 24 has been moved to a location that is at a distance D1 (measured perpendicular to the side 508 of the building). In contrast, in FIG. 2, the winch 24 has been moved (in this embodiment, by driving the vehicle 26) to a further distance D2 (measured perpendicular to the side 508). With the winch 24 located at D1 (FIG. 1), the container 30 rests against the side 508 of the building and there is some slack in the near portion 31 of the loop of cable 28 (that is between the winch 24 and a point at which the container 30 is secured to the loop of cable 28). Note, however, that the far portion 29 of the loop of cable 28 has essentially no slack (due to the weight of the container 30).

As the winch 24 is moved outward to distance D2 (FIG. 2) the distance L increases while H remains constant (see FIG. 1). In addition, the slack in the near portion 31 of the loop 28 is reduced, and has been moved to an angle large enough with respect to the side 508 that the container 30 is pulled clear of the building. This may help, for example, keep any evacuees and rescue personnel that are in the container 30 away from the flames 510 or other building related dangers or items that might protrude from the side 508, as the container 30 is lowered. The position of the winch 24 with respect to the building may accordingly be adjusted as needed, to not only adjust the tension in the near portion 31 of the loop of cable 28 but also to move any load that is suspended by the loop of cable towards or away from the side of the building.

Note that the overall length of the loop cable 28 should be designed so as to allow for reasonable distances D1 and D2 to fall within an area next to the base 506 of the building that preferably can be easily accessed by emergency equipment and personnel when responding to a disaster situation in the building 500. However, an alternative to having the winch 24 move horizontally to adjust loop tension and horizontal load position is to provide for its vertical movement (or some combination of both). For example, the winch 24 could be installed on a short, elevator-type mechanism. Another possibility is to secure the winch 24 to a ramp whose angle with respect to the ground may be changed by activating a power mechanism. Other alternatives that can increase or decrease the tension in the portion of the loop of cable 28 from below the suspended load to the winch, to thereby change the position of the suspended load with respect to the side 508 of the building, may also be used.

The vehicle 26 may also be equipped with an anchor feature to keep the vehicle (and hence the winch 24) fixed in a single location despite the forces generated while the loop of cable has been installed and is under tension. One example is to rigidly attach the vehicle to a lamp post or other relatively immovable structure; another may be to the the vehicle in several different directions to respective anchor rings built into the area next to the base of the building.

Figure 3A:
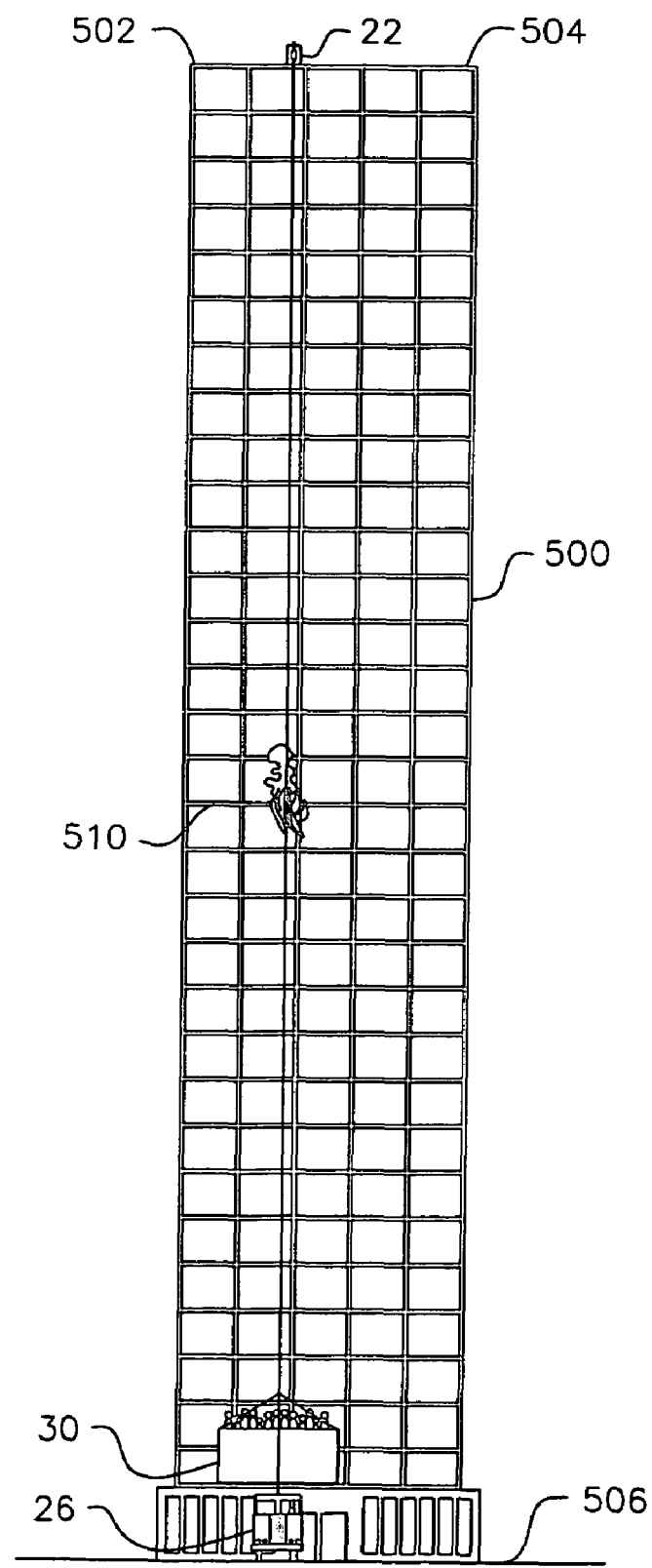
FIG. 3A is a conceptual diagram depicting a front elevation view of the embodiment of the system in FIG. 1.
Figure 3B:
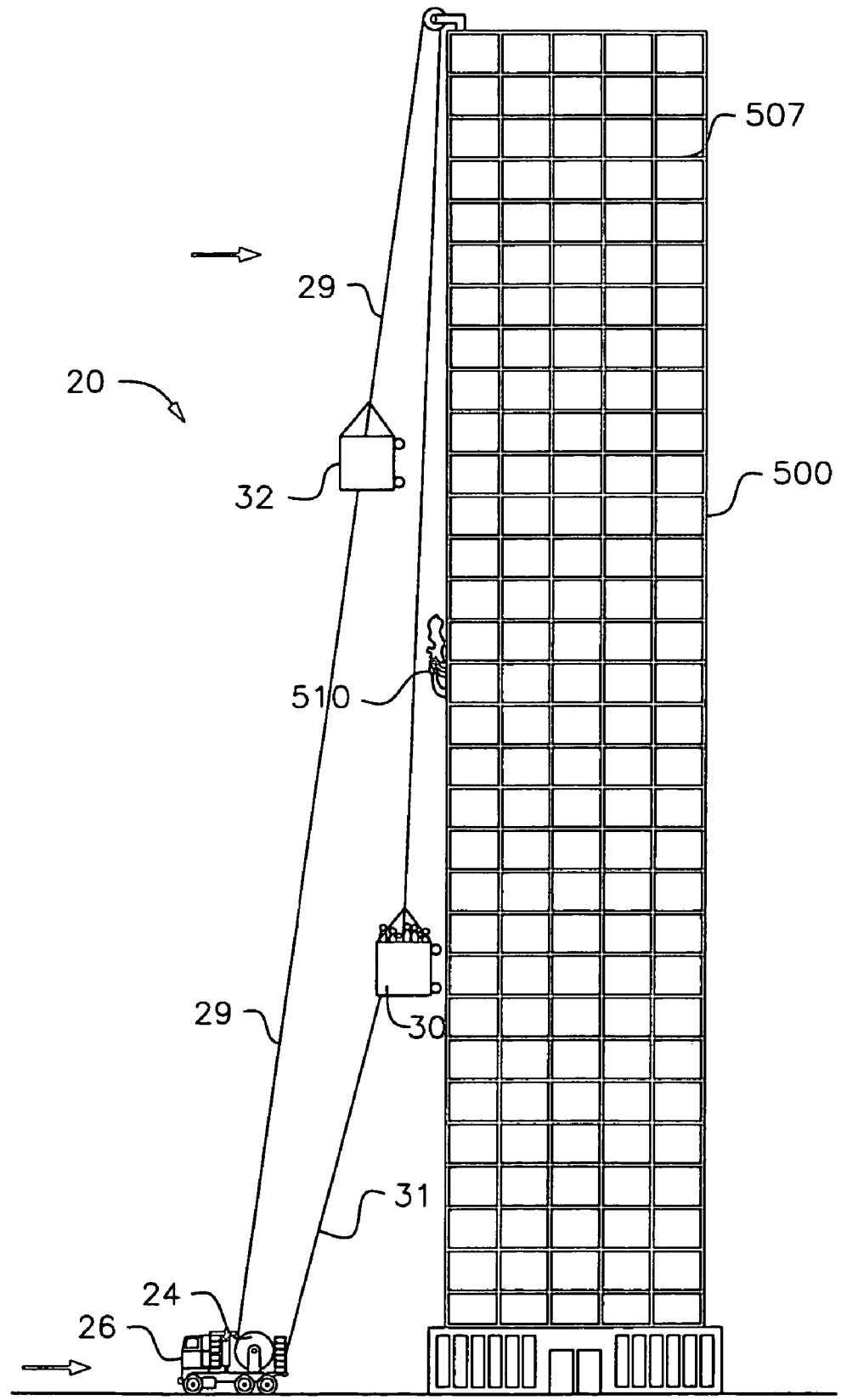
FIG. 3B is a conceptual diagram depicting a side elevation view of a dual-sided embodiment of the system, showing the heavier of two containers aligning itself closer to the side of the building.

In those embodiments where a second container 32 is attached to the far portion 29 of the loop of cable 28, FIG. 3B is provided to illustrate such dual-sided embodiments with a side elevation view of the system 20. The heaviest load (if there is more than one) attached to the loop may tend to align itself closest to the side of the building. Accordingly, in the embodiment shown here, it is the container 30 (which is loaded with evacuees or some other load) that has positioned itself closest to the side of the building.

Figure 4A:
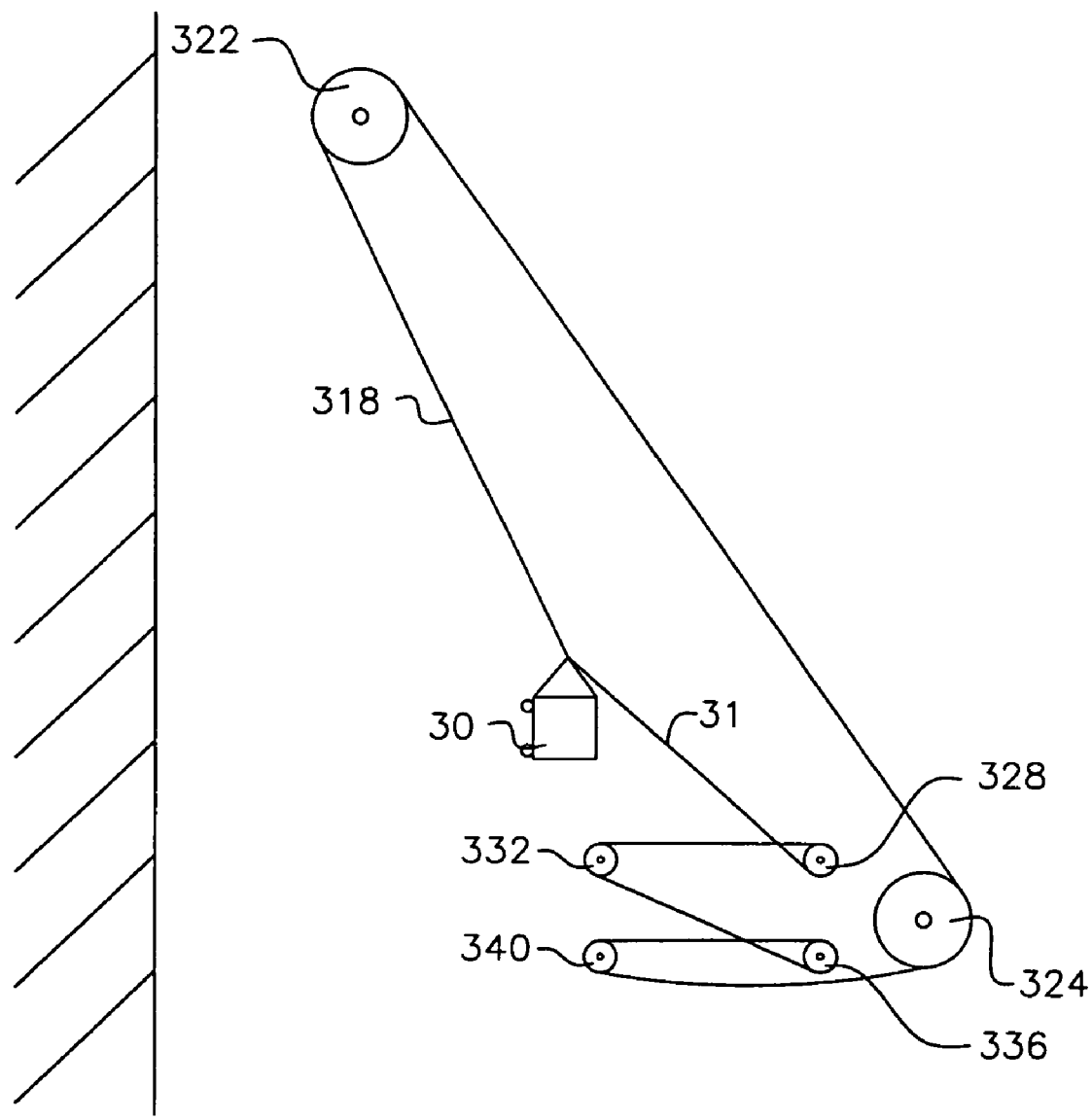
FIGS. 4A-4C are conceptual diagrams of other embodiments of the system.

Turning now to FIG. 4A, a diagram of yet another technique for moving a suspended load (here, the container 30 attached to a loop of cable 318), towards and away from the side of the building 500, is shown. The system in this embodiment has a top pulley 322, a winch or traction pulley 324, and a set of four additional pulleys 328, 332, 336, and 340. Some or all of the additional pulleys 328-340 are preferably located on the same vehicle (not shown) as the one to which the winch 324 is secured. The loop of cable 318 is operatively installed around all of these pulleys. Note that the diagram is not to scale, and is merely being used to illustrate the operation of the system. In practice, the relative size, location, and number of pulleys 322-340 may be different than shown. See for example, the system in FIG. 4B where there are only two additional pulleys 426, 428, on either side of a winch 424, and where cable tension can be added or reduced from the far portion 29 as well as the near portion 31 of a loop of cable 418.

Referring to FIG. 4A, moving the pulleys 332, 340 (also referred to as adjuster pulleys) to the left of the figure while keeping all other pulleys in the system still may add tension to the near portion 31 of the loop of cable 318 (below the suspended container 30), and cause the container 30 (as suspended) to move to the right, away from the building 500. In contrast, moving the adjuster pulleys 332, 340 to the right (while keeping all others still) may remove tension from the near portion 31, thereby causing the container 30 to move to the left, closer to the building 500. More generally, any one or more of the pulleys 328-340 may be designed to be moveable so as to achieve the desired addition or reduction in tension on the near portion 31. The same explanation may apply to the embodiment of FIG. 2, where moving the vehicle 26 to the further distance D2 may add more tension to the loop of cable in the near portion 31 below the suspended load, thereby causing the container 30 to be pulled away from the building 500. The reverse is also true, to allow the container 30 to move back towards the building.

Figure 4B:
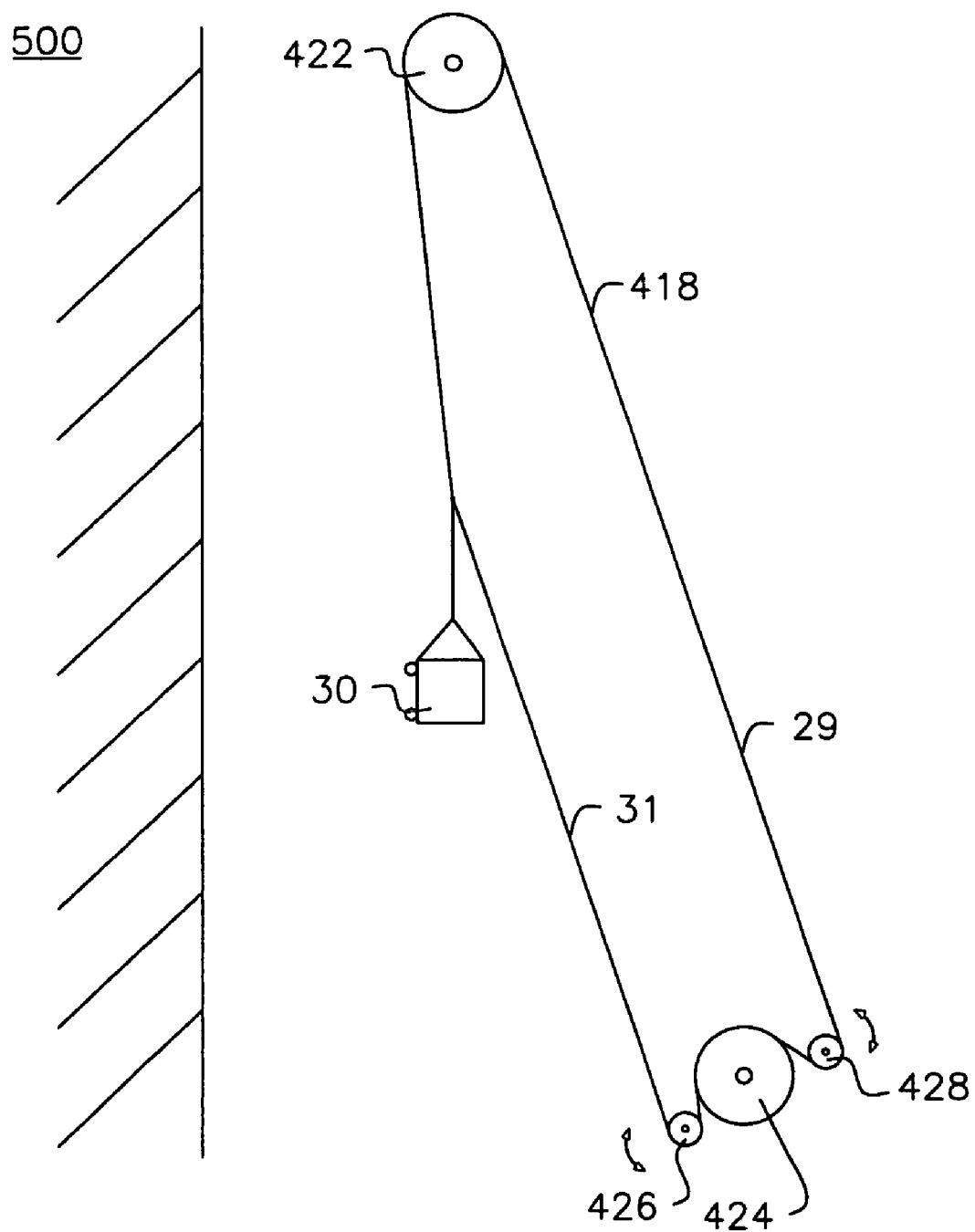
Figure 4C:
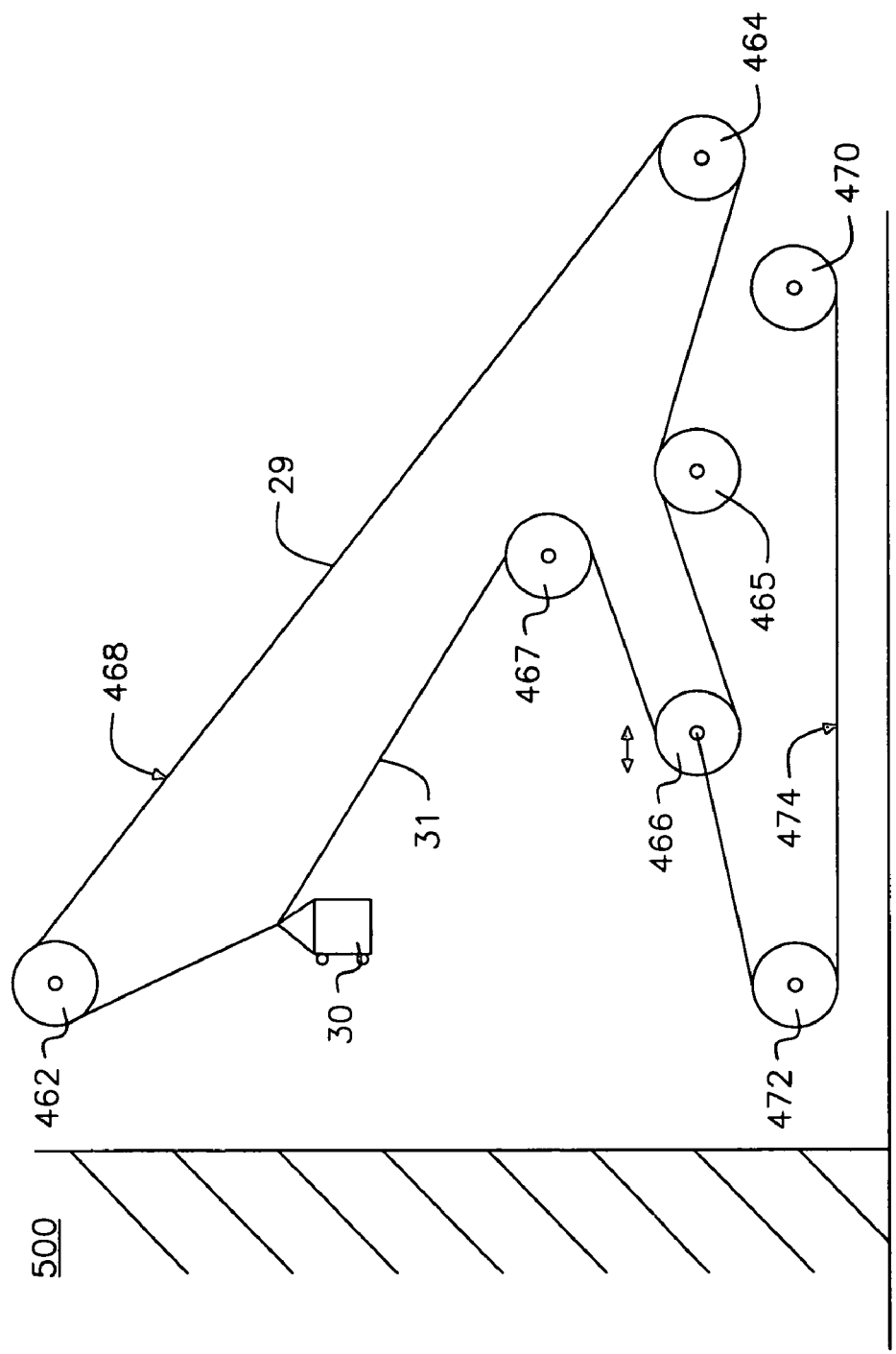

Turning now to FIG. 4C, a conceptual diagram of yet another technique for moving the suspended load (here the container 30 attached to a loop of cable 468), towards and away from the side of the building 500, is shown. The system in this embodiment has a top pulley 462 which may be permanently attached to the roof or above an upper floor of the building 500, a winch or traction pulley 464, and a set of two additional, so-called "deflector" pulleys 465 and 467. One or both of these deflector pulleys 465, 467 are preferably anchored to the same vehicle (not shown) as the one to which the traction pulley 464 is secured.

In addition, the system also has a moveable or adjuster pulley 466. The adjuster pulley 466 in this embodiment is "floating" in that it need not be held other than by tension in the loop of cable 468 and an adjustment cable 474. In this embodiment, the adjuster pulley 466 is floating, while all other pulleys in the system as shown (pulleys 462, 464, 465, 467, and 472) remain fixed. Tension in the loop of cable 468, and in particular in the near portion 31 below the suspended container 30, may be adjusted by a drum winch 470. The drum winch 470 rotates, to alternatively pull and let out the adjustment cable 474. The adjustment cable 474 is installed around the drum winch 470 at one end, is connected to the adjuster pulley 466 at another end, and is installed around the pulley 472.

While the adjuster pulley 466 is floating, the pulley 472 is preferably permanently secured to the building 500 near its base as shown. On the other hand, the traction pulley 464, as well as the deflector pulleys 465 and 467, along with the drum winch 470, may be secured to a vehicle (e.g., a Fire Department truck), not shown, that will arrive at the scene in the area next to the base of the building 500 in the event of an emergency situation involving the building. The same vehicle may also be used to deliver the adjuster pulley 466, as well as perhaps the pulley 472. An operator of the system (such as an emergency worker) may control the raising and lifting of the suspended container 30 by activating the traction pulley 464 in one of its two opposite directions, and may also move the suspended container 30 towards and away from the side of the building 500 by activating the drum winch 470 in one of its opposite directions of rotation.

Figure 5A:
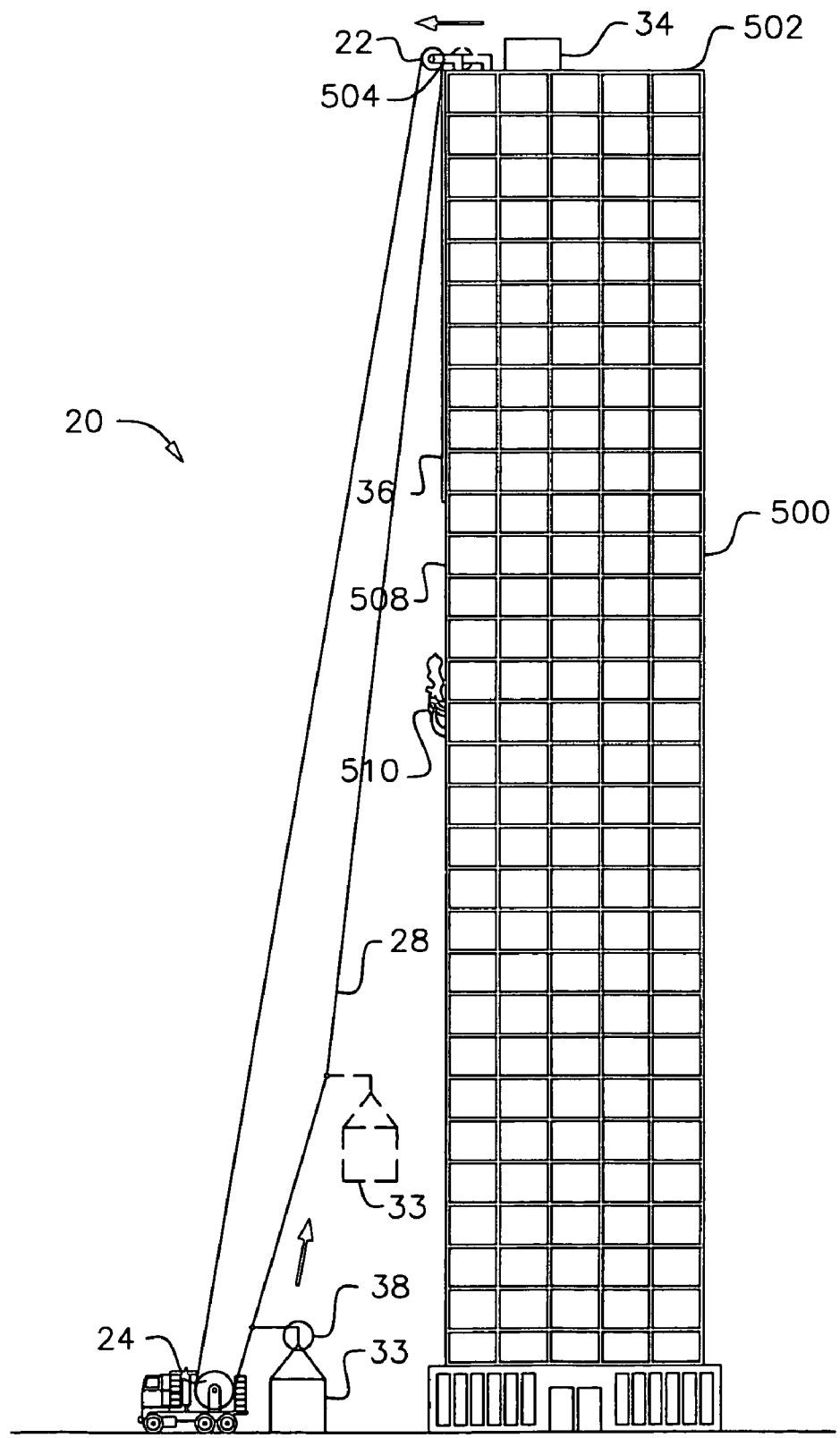
FIG. 5A is a conceptual diagram depicting a side elevation view, showing other features of the system.

As mentioned above, the top or upper pulley 22 may be permanently attached to a structural support of the building 500, and located in a single position near an edge 504 of the roof 502. This arrangement may be modified as shown in FIG. 5A, such that the pulley 22 is moveable from a retracted position on the roof 502 to an extended position as shown, where pulley 22 hangs over the edge 504. Pulley 22 may have an axle that is fixed parallel (or fixed perpendicular) to the face or side 508 of the building as shown. Alternatively, the axle may swivel, so that it may be positioned at a variable angle to the side 508 during operation of the system. In addition, the loop of cable 28 may be stored on the roof 502, such as in a housing 34. The loop of cable 28 may then be deployed automatically, by first connecting it around the pulley 22, and then dropping or letting the loop of cable down from the roof so that it may reach the winch 24. Alternatively, the loop of cable 28 may already be installed around the pulley 22 and is stored in a vertical housing 36 which extends down the face 508 of the building 500. In that case, the loop of cable 28 may be deployed by opening the vertical housing 36 and letting the loop down to the winch 24 on which it will be installed. In the automatically deployed embodiment, a mechanism may be provided that automatically deploys the loop of cable in response to receiving a radio signal from the Fire Department or other entity that will be operating the system. For even faster deployment, the loop of cable 28 may be left completely extended, down to the base, and removably secured to the area next to the base of the building at all times prior to deployment for rescue operations.

Referring now to FIG. 5B, a container 530 is shown that provides some clearance for the far portion 29 of the loop of cable 28. The container 530 has two load areas 530, 536 that are attached to a common brace 535. One end of the loop of cable 28 may be passed through a top ring 531 and attached (via a safety hook, for example) to a bottom lifting ring 533. The other end of the loop may be attached to the bottom lifting ring 533 as shown. Some form of stabilization mechanism (e.g., see FIGS. 9-10 below) may be added to maintain stability of the container 530 while it is suspended and being raised or lowered next to the building 500.

Figure 6A:
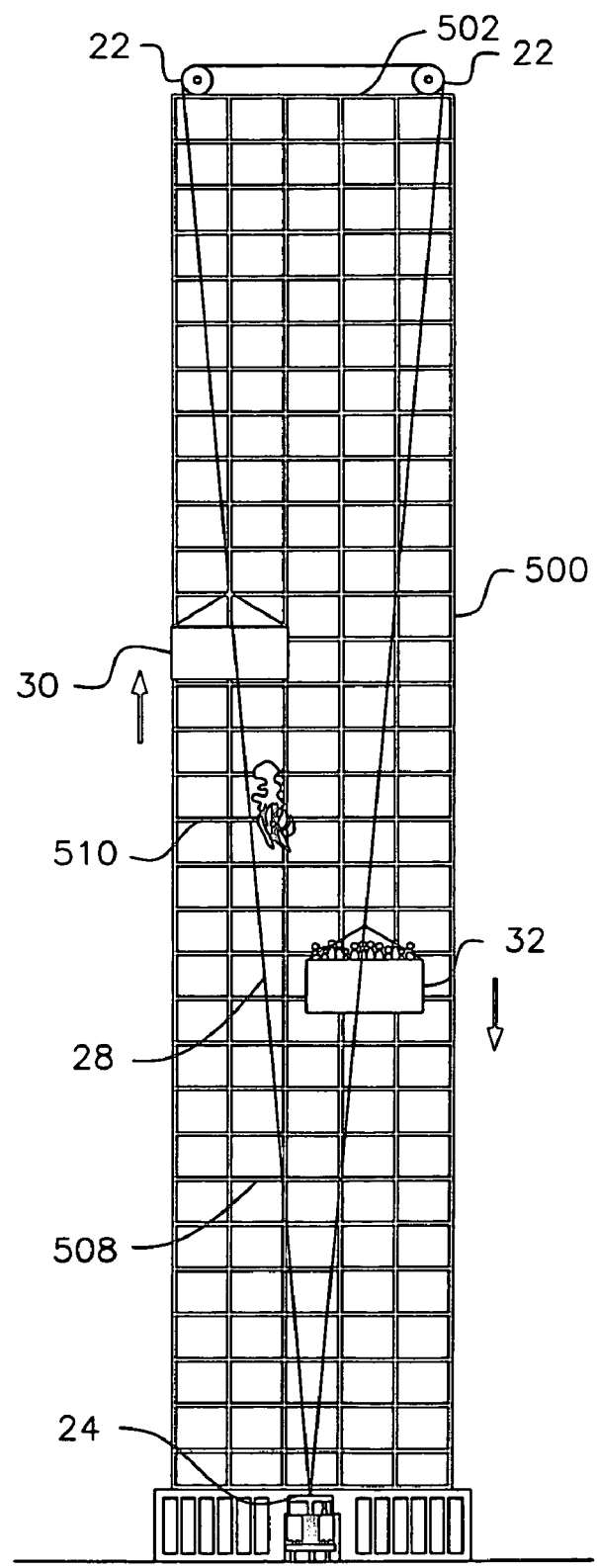
FIG. 6A illustrates a front elevation view of an alternative embodiment of the system.

Turning now to FIG. 6A, a front elevation view of another embodiment of the system 20 is shown. In this embodiment, there are two spaced apart pulleys 22 that are mounted on the roof 502. The loop of cable 28 in this instance is connected around both pulleys 22, as well as the winch 24. Rather than being oriented substantially parallel to the face 508 of the building (as shown in FIGS. 1-4C), the axles of the pulleys 22 are, in this embodiment, oriented substantially perpendicular to the face 508. This version is useful for the dual-sided embodiment, where a wider separation between the containers may be maintained to reduce the possibility of interference at the mid point of travel where the containers 30, 32 pass one another. It also provides two, alternating loading positions which are side-by-side next to the same side of the building (compare, FIG. 3B).

Figure 6B:
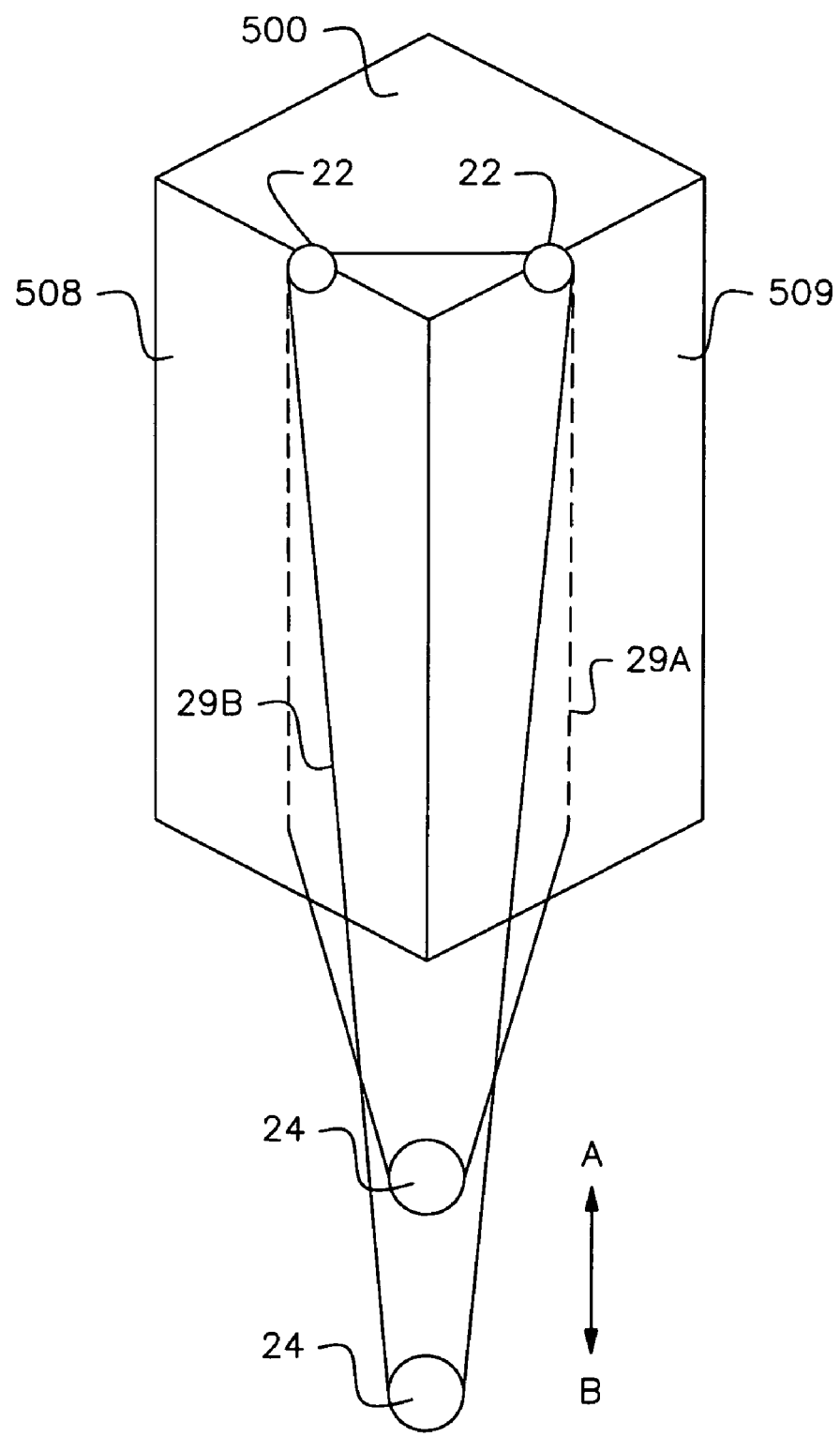
FIGS. 6B and 6C illustrate an embodiment of the system that allows access to the upper floors of a building on two adjacent sides.
Figure 6C:
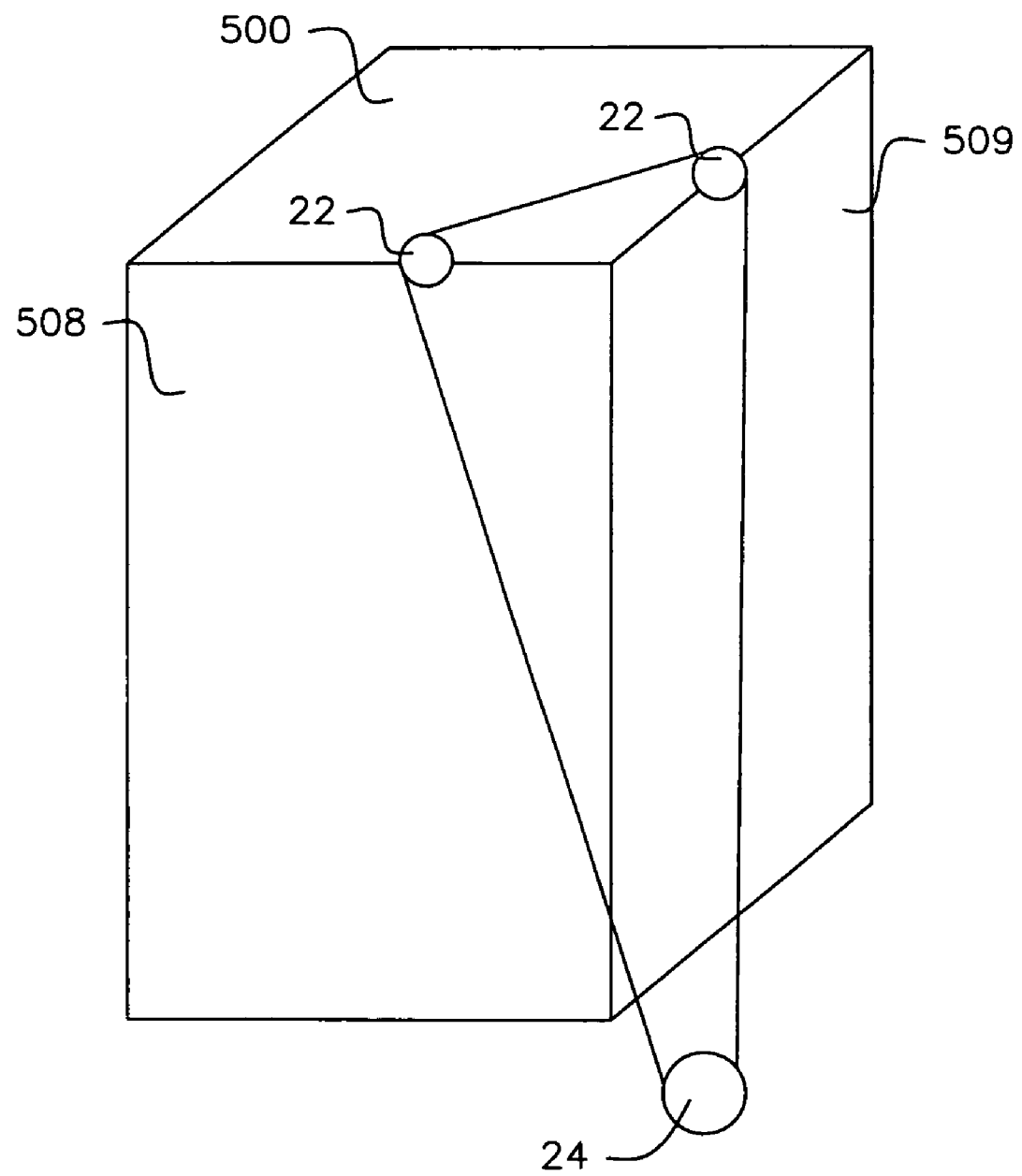

In contrast to the embodiment of FIG. 6A, FIGS. 6B and 6C show a two sided version of the system in which different loading positions are provided next to two different, adjacent sides 508 and 509 of the building 500. In this embodiment, the two pulleys 22 are positioned near the top of the building 500 near the edge of the adjacent sides 508 and 509, respectively. FIG. 6B illustrates a front view while FIG. 6C illustrates a side perspective view. Note that the winch 24 may be provided with two different positions A and B near the bottom or base of the building 500. Position A is closer to the sides 508 and 509 (or at a higher elevation) than position B. The loads (not shown), which are attached to the different sides 29A and 29B, respectively, of the loop of cable 29, will hang closer to the building 500 when the winch is at position A. Moving the winch 24 outwards or downwards to position B will move the suspended loads away from the sides 508 and 509 of the building. Finally, activating the winch in one direction will raise one load while simultaneously lowering the other, and the reverse occurs if the winch is activated in a reverse direction.

Figure 7:
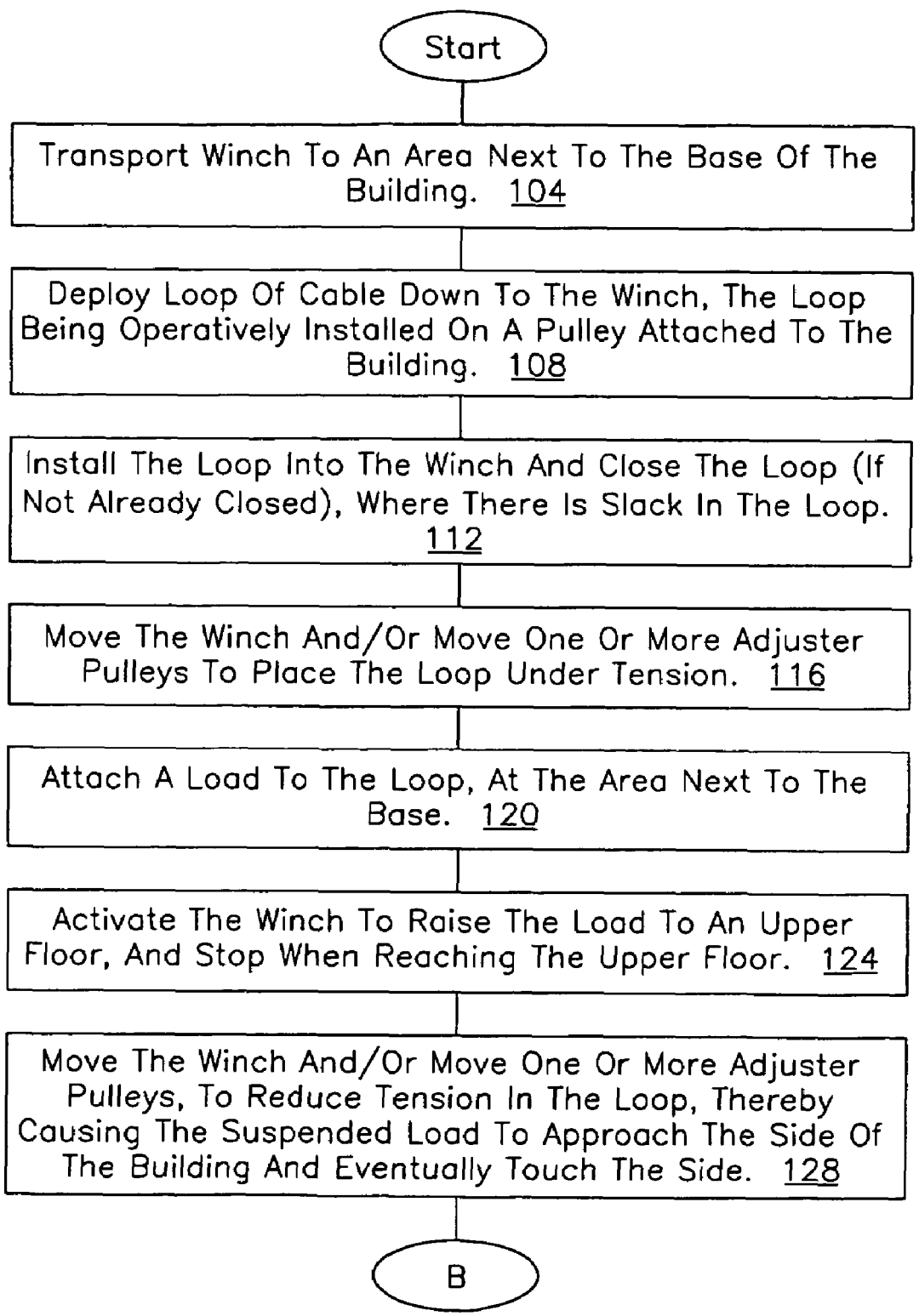
FIGS. 7 and 8 depict a flow diagram for a method of accessing an upper floor of a multi-story building.
Figure 8:
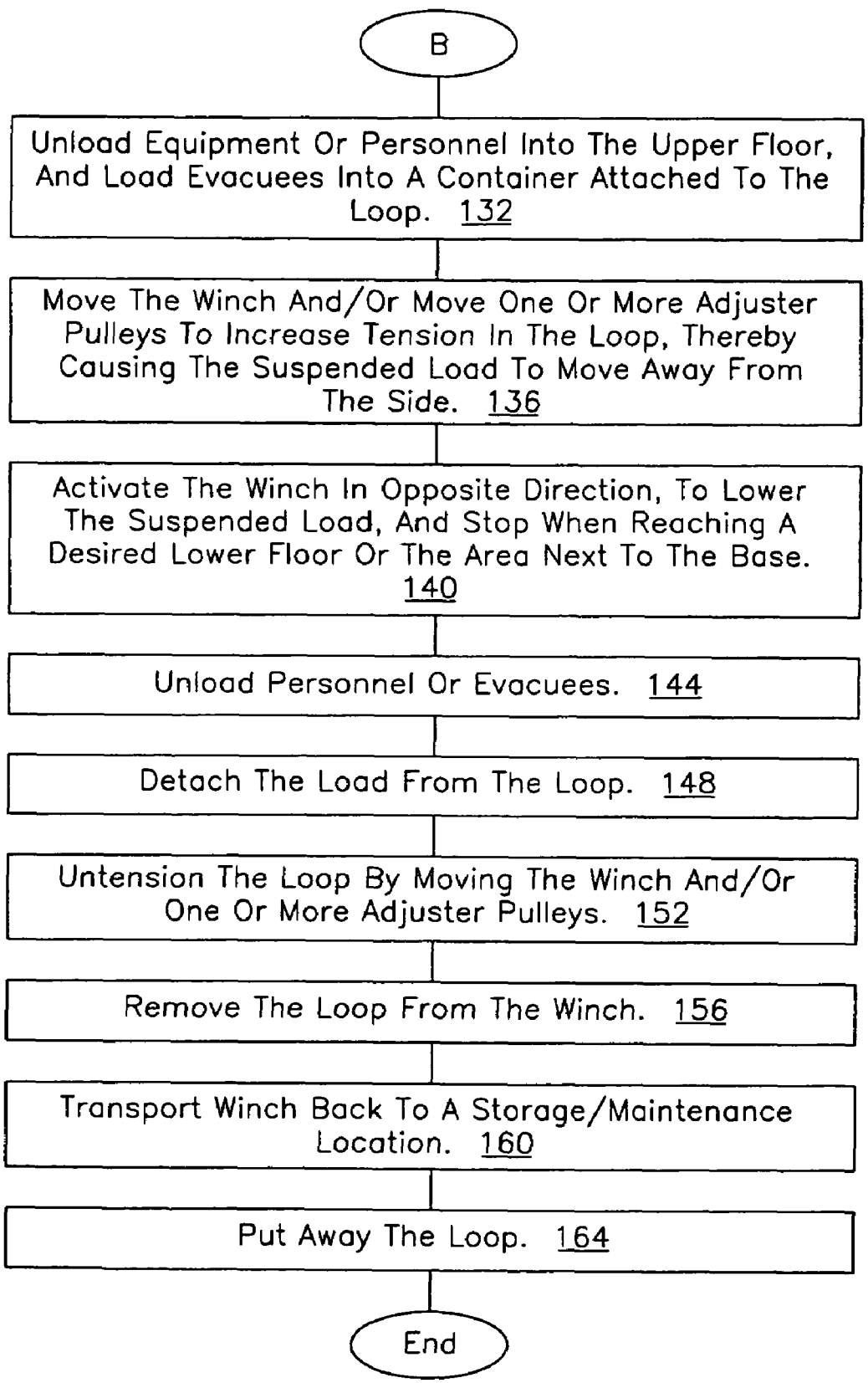

Referring now to FIGS. 7 and 8, a flow diagram of a method for accessing from outside an upper floor of a multi-story building is shown. This method is now described, with occasional references made to the embodiments of the system 20 shown in FIGS. 1-6C (the method also applies to other embodiments of the system 20 that are not shown). Operation begins with a request being made to access the building, such as an emergency 9-1-1 call during a disaster situation in which the built-in elevators of the building may or may not be operational, or access to the upper floors through means such as interior or exterior stairwells in the building may or may not be available or is too impractical. In response to the request, a winch may be transported to an area next to the base of the building (104). A loop of cable may be deployed down to the winch, where the loop is operatively installed on a pulley that is attached to the building (108). In some cases, the loop of cable may already be fully deployed and, for example, secured to the base of the building where it is accessible to the operators of the winch. In either case, the loop is installed into the winch, and the loop is closed, if not already closed (112). At this point, when the loop has been installed into the winch, there preferably is some slack in the loop to ease installation into the winch. Next, the winch may be moved horizontally or vertically, to place the loop under tension (116). As an alternative, the winch may be kept still while moving one or more adjuster pulleys. Examples are shown in FIGS. 4A-4C where the loop of cable is under tension, in both its near and far portions. There may be intermediate locations of the winch and/or adjuster pulleys where a near portion of the loop (that hangs below the load attached to the loop) varies between light and heavy tension, to move the load closer to or farther from the building. Operation may then proceed with attaching a load to the loop, at the area next to the base of the building (120). As will be described below, this may be done in any one of several different ways. For example, the load may be a container that has a hook which can be removably attached to a ring that is permanently affixed to the loop of cable.

Operation proceeds with activating the winch to raise the attached load to an upper floor of the building, and then stop the winch when the load has reached a desired level, e.g. near that of a desired upper floor (124). The winch may then be moved to reduce tension in the loop, thereby causing the suspended load to approach the side of the building and, if desired, eventually touch and lie against the side (128). As explained above, other ways of reducing tension in the loop (to move the suspended load towards the building) may alternatively be used, e.g. see FIGS. 4A-4C).

Next, referring now to FIG. 8, equipment or personnel may be unloaded into the upper floor. Alternatively, evacuees may be loaded, for example, into a container attached to the loop (132). The container may, if desired, be secured to the upper floor while loading and unloading. Once finished with the loading or unloading, operation proceeds with moving the winch, this time to increase tension in the loop and thereby cause the suspended load to move away from the side of the building (136). Again, other ways of adding tension to the loop of cable (as installed in the system) may alternatively be used, e.g. see FIGS. 4A-4C. While away from the side of the building, the load can be lowered without being impeded by anything that may protrude from the side of the building. The winch is then activated in the opposite direction, to lower the suspended load, and stop when the load has reached a desired lower floor or has reached all the way down to the area next to the base (140). After having unloaded any personnel, evacuees, or equipment (144), any further parts of the load may be detached from the loop (148).

The above described operations 124-144 may be repeated to access additional, upper floors of the building as needed. When finished with use of the system, the winch and/or adjuster pulley may be moved to untension the loop (152) followed by removal of the loop from the winch (156). The winch may then be transported back to a storage or maintenance location, such as a Fire Department station (160). Finally, the loop of cable may be put away, by, for example, being reeled back up into its housing on the roof or secured to the side of the building (164).

Although the operations of the flow diagram above were described sequentially, that does not mean that the operations in all cases must be performed sequentially. For example, in operation 112, the loop may be closed (if not already closed) prior to, rather than after, installing the loop into the winch. As another example, the load may be attached to the loop before placing the loop under tension (operations 120 and 116). To effect such variations, it may be necessary to design the load and the manner in which the load is attached to the loop differently. For example, the load may include a different container 33 as shown in FIG. 5A, where a rigid support structure 38 is a part of the container that connects to the loop of cable 28. Other alternatives for the design of the container, such as replacing the rigid structure 38 with multiple sections of flexible wire rope, are possible.

Figure 9:
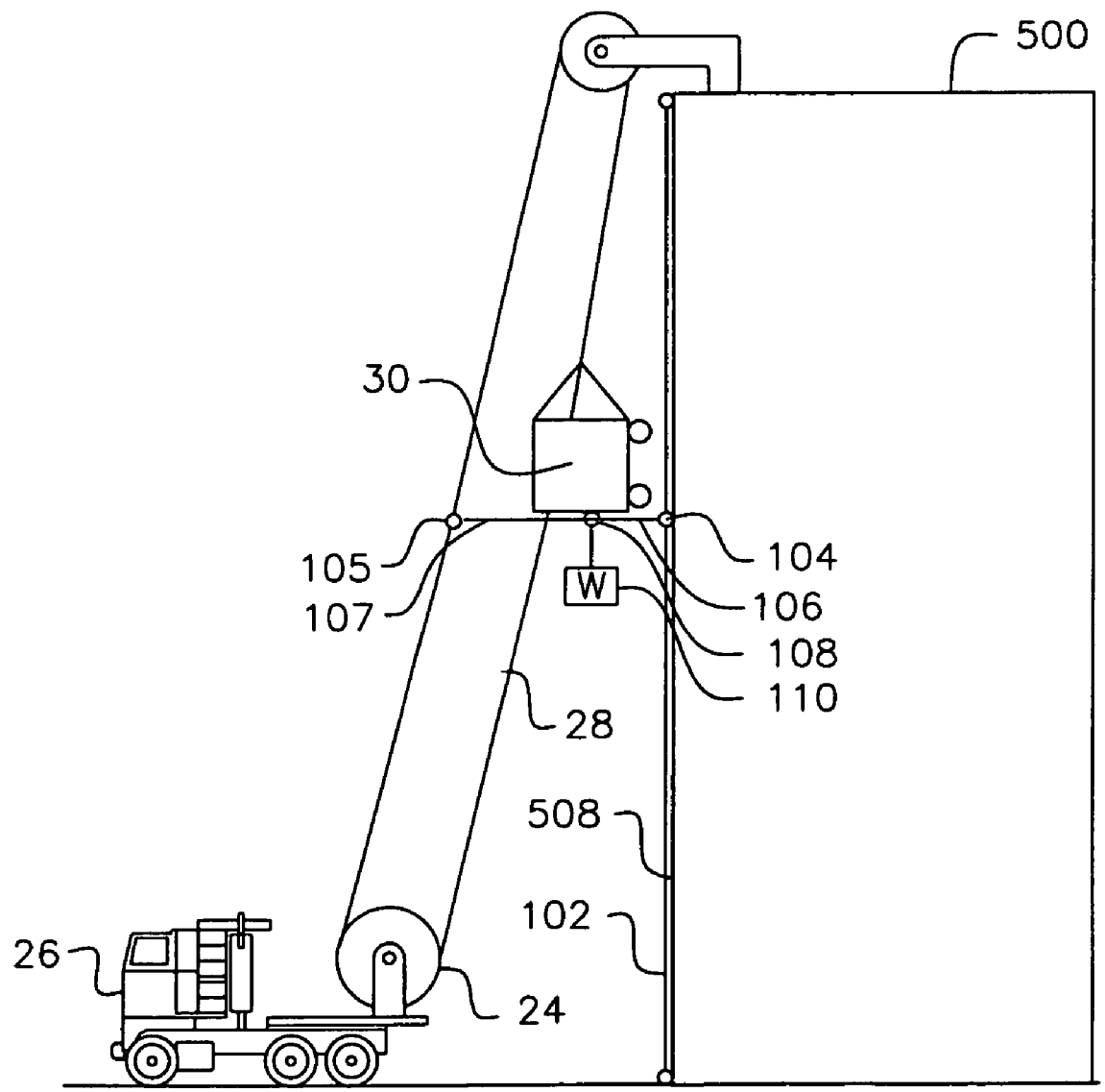
FIG. 9 shows a side elevation view of a method of stabilizing the container.

Referring now to FIG. 9, a side elevation view of a technique for stabilizing the container 30 is shown. In this embodiment, the container 30 is stabilized to the building 500 using a mechanism that includes a guide cable 102 that is attached to the side 508 of the building and runs along this side between the upper pulley and the base as shown. A first guide line 106 is provided that is under tension and connects the guide cable 102 to the container 30. The guideline 106 slides along the guide cable 102 through a ring 104. Another ring 108 is secured to the bottom of the container 30 and through which the guideline is passed. The guideline 106 is kept in tension by a weight 110. The weight 110 continuously pulls the container 30 towards the building 500, to stabilize it in relation to the building and the loop of cable 28. As the container 30 is moved up and down by the winch 24, the ring 104 slides up and down the guide cable 102 to continuously urge the container 30 towards the building 500.

In addition to the mechanism described in the previous paragraph, the container 30 may be further stabilized to the far section of the loop of cable 28. This may be achieved by passing the far section of the loop of cable 28 through a further ring 105, as shown. The mechanism works substantially in the same manner as in the other embodiment in that the weight 110 continuously pulls down on a further guideline 107, urging the container 30 towards the far section of the loop of cable 28. In such an embodiment, the tension to the guide cable 102 should preferably be greater than the tension to the far section of the loop. Note that instead of using a single weight 110, the tensions may be applied manually by the occupants of the container 30, or through some other alternative such as multiple, separate weights.

The stabilizing mechanisms described above do not interfere with the ability to move the container 30 towards or away from the side 508 of the building as desired, by moving the winch 24. Thus, as can be seen in FIG. 10, the container 30 has been moved all the way up against the side 508 of the building, by moving the winch 24 upwards (via raising a ramp 25 of the vehicle 26) so as to create some slack in the near portion of the loop of cable 28, as shown.

Figure 10:
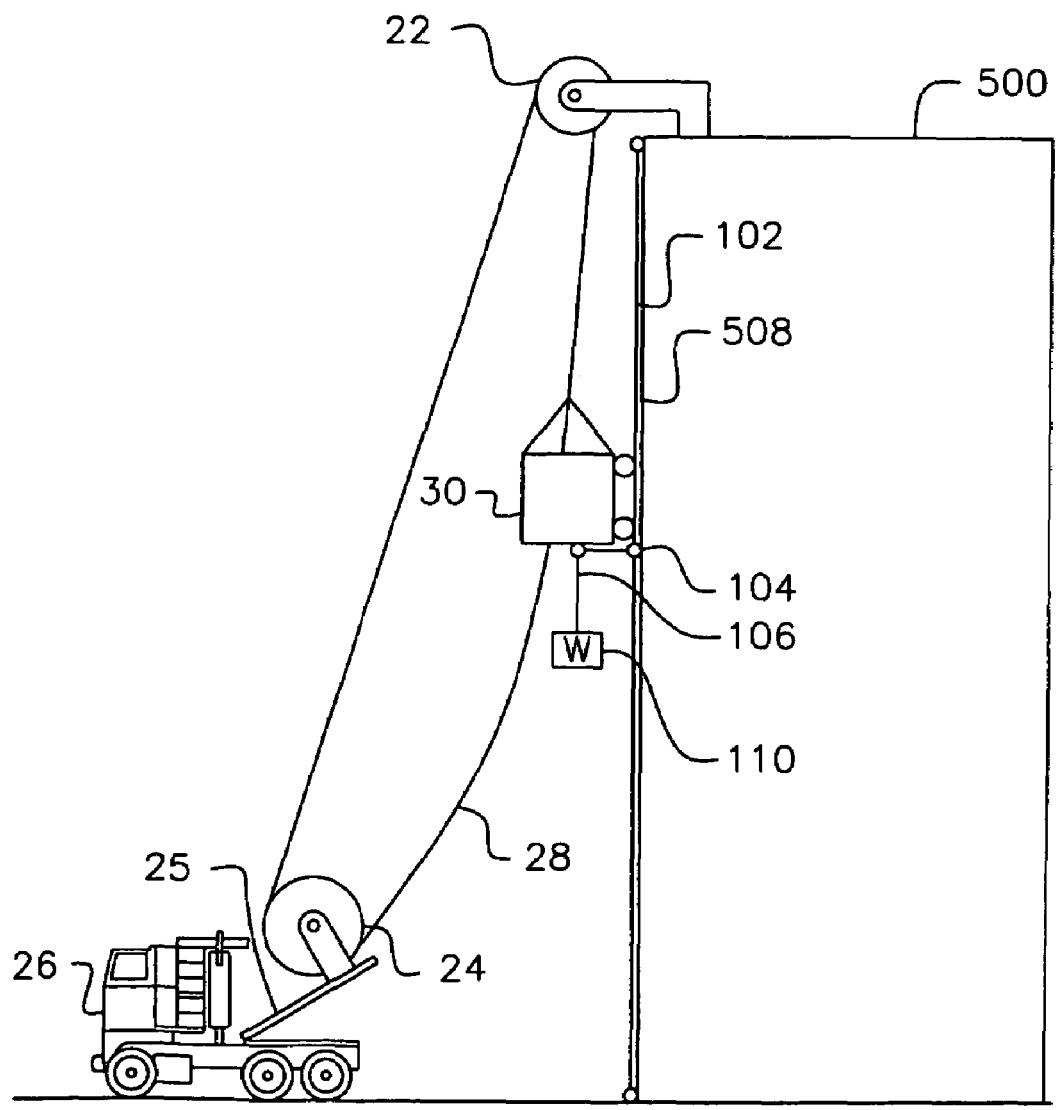
FIG. 10 shows a view similar to FIG. 9 with the container against the building.

It should be noted that in FIG. 10, the far portion of the loop of cable 28 remains under tension between the winch 24 and the pulley 22. This tension is caused by the weight of the container 30 (and the weight 110) pulling down on the loop of cable 28, while the far section of the loop of cable 28 is held by friction against the surface of a drum in the winch 24. The sections below give additional details regarding the loop of cable, the pulley, and the winch, as well as other features of the system.

Container

The various embodiments of the invention described above allow access to an upper floor of a multi-story building from outside, without the need for an enclosure shaft or guide rails used by typical freight elevators. There are different types of containers that can be attached to the loop of cable of this system. They may be completely rigid, cage like structures, or may be composed of a platform with a flexible net. The portability of the containers, however, should be considered as a factor that effects their design. In particular, more than one container may need to be delivered, to the building, together with the winch. Alternatively, the containers may be stored at the building site rather than transported to the building. In addition, the container should preferably allow quick entry and exit by the evacuees. Also, if building projections are expected to keep the container from reaching the face of the building (even after the container has been moved as close as possible towards the building), some type of walkway to the container should be provided, for example, integrated with the container. Closeable entrances to the container are also desirable.

As described below, the loop of cable may be provided with a lifting ring to which the top of the container may be attached via a safety hook. This will allow the container to swing freely while suspended, depending upon the length of the line that attaches the hook to the top of the main structure of the container. Some movement is desirable, to help in manually positioning the container for loading and unloading. As an alternative to a top connection, the attachment line may be directly attached to a floor of the container. In that case, the container should be steadied at its top by the tension in the loop of cable that is hoisting the container. Although not shown in the figures, wheels should be fitted to the bottom of the container, preferably with brakes, for ease of movement when on the ground.

The container may also be designed to carry extension ladders, grappling hooks, crowd control equipment, cameras, batteries, generators, pumps, litters, harnesses, saws, and cutters.

Cable

The preferred type of cable to use is wire rope whose size and type should be selected based upon the load capacity and traction design of the system, as well as the structural capacity of the pulley. While larger rope diameters can handle larger loads, smaller diameter wire ropes are, in general, easier to handle, less expensive, and require smaller pulleys. As an example, the wire rope diameter may be expected to be between ⅜ inch with a braking strength of about 15,000 lbs., and ½ inch with a braking strength of about 26,000 lbs. When used for rescue purposes, such as by the Fire Department, all instances of the system should preferably use the same, preselected wire rope size. Of course, these are only example dimensions such that in practice different dimensions may alternatively be used as appropriate.

The loop of wire rope should be draped over the top pulley, and should be long enough to reach an area next to the base of the building. For example, in the case of a single pulley embodiment, the length of the loop may be twice the vertical distance between the pulley and the base, plus about 10% height to allow the loads to be moved clear of the building, as was described above.

Winch

The winch may be a traction hoist that uses power and braking to directly act upon the far section of the loop, where power is used to pull in the far section and thereby lift a load that is attached to the near section, and braking is used to let out the far section to thereby lower the load. Where loads are attached to both the far and near portions of the loop (e.g., containers 30 and 32 in FIG. 3B), the winch should have both forward and reverse traction to power the lifting and lowering of the heavier container. The following description of the power requirements for the winch is provided in the context of an example, where a single container being a basket is provided with a combined load of the basket and its contents of 5,000 lbs., to travel upward at 500 feet per minute. The theoretical power requirement in this case is estimated to be 75 horsepower. If total system efficiency is estimated at fifty percent, for a hydraulically driven system, the power requirement would be 150 horsepower. Of course, reducing the specification to 250 feet per minute and 2,500 lbs. would reduce the needed horsepower to less than 40 horsepower. By using variable volume hydraulic drives, the system may be able to raise heavier loads at slower speeds and light loads at full speed. With adequate braking available, heavy loads may be lowered at the desired speed independent of the horsepower of the system. Depending on how the winch is transported, the system could be driven from a power takeoff on the same vehicle as the one to which the winch is anchored (e.g., pumper), or from a separate Fire Department engine or trailer that arrives on the scene.

As an alternative to a hydraulic system, a modified, electric elevator drive system powered by a portable generator may be used. Note that both hydraulic and electric drives are expected to have an inherent ability to provide speed control, as well as power for lifting and braking for lowering the loads.

Several techniques may be used for providing traction to raise and lower the load on the cable. One example is to apply sufficient hydraulic pressure on pressure rollers (of the winch) against the cable, to generate the required traction as the cable passes once under the traction drum. Another technique is to use deflector sheaves or diverters, to increase the contact radius to provide more traction with less required pressure on the cable. Yet another technique is to provide back pressure on the unloaded "tail line" or near portion of the loop of cable, to increase the traction; this may preferably be self-energized by a pressure roller whose force is generated by the tension created by the suspended load. This tail line back tension may be generated by passing the cable between a set of torque controlled, powered rollers. Another method is to pass the cable between two pressurized halves of a split sheave. The pressure may be created with springs or hydraulic cylinders, and tail line back tension may be added, if necessary. The split sheave traction principle may be preferable for the two-sided embodiments (FIG. 3B).

Note that the winch may be composed of a traction sheave (not shown) that lies flat, i.e. horizontal with a truck bed of the vehicle 26, see FIG. 1. The traction sheave may pivot against a fixed, pressure roller (not shown). Deflector pulleys (also not shown) may be provided to direct the two sides of the loop of cable 28 towards the upper pulley 22. In such an embodiment, the upper pulley is preferably positioned parallel to the side of the building (rather than perpendicular as shown in the conceptual diagram of FIG. 1). The winch may also be breech loadable, so that it can open up to allow installation of a looped portion of the cable, as compared to feeding an end of the cable through the winch. Other winch designs, and orientations of the pulley 22, are possible.

The winch, which may be part of a control unit (not shown) for the entire system, may be placed at any location near the building that can be reached by, for example, the Fire Department. The winch may be placed in line with the pulley, at a right angle from the face of the building (FIG. 3). Where the right angle location is not practical, however, the winch may be placed at an oblique angle to the building face. It is preferable that the intended winch and pulley locations for each building be designated in advance, so the correct lengths of wire rope may be provided on the building.

Cable Connections

The containers that are attached to the cable are to travel up and down, preferably between the pulley at the top and the winch below. These containers, with their connections to the cable, need not pass over the pulley or under the winch. Accordingly, secure connections of most types may be used at the appropriate selected positions on the cable, without clearance concerns.

The cable may be cut to a single, continuous piece having a length that is twice the distance from the pulley to the designated position of the winch (e.g., at the base of the building). A ring may be attached at one end of the cut cable, and a snap hook at the other end can be used to connect the two ends to form a closed loop. The ring and snap hook may be assembled to the cable with thimbles. The ring also provides a secure attachment for hanging the container (or other load) to the cable.

As an alternative, the loop of cable may be formed of two separate, continuous pieces, each of a length that is one-half the distance between the pulley and the operating position of the winch at the base of the building, with similar ring and hook assemblies on the ends of each piece. This will also provide secure positions at opposite ends of the cable, for attaching two loads (e.g., containers 30, 32), such as for the dual-sided embodiments.

Yet another connection mechanism for connecting a container to the cable may be a quick acting rope grip, similar to those used to connect gondolas to wire ropes on ski lift systems.

Pulley

At least one, and in some cases two pulleys or sheaves, may be used in the system. An advantage of using two sheaves is that when two baskets are used as in the dual-sided embodiments, there is clearance for the baskets to pass each other, without the need to move the winch to provide clearance. In the dual sheave embodiment (see FIGS. 6A-6C), the sheaves should be able to rotate so that the pulley wheels may align themselves in the direction of the tension in the wire rope. If the architect or the building owners would like the two sheave installations to be less noticeable, deflector pulleys may be used.

The sheaves may be permanently or temporarily attached to the structure of the building in different ways. The choice may depend on the architect's attitude towards the appearance of the system on the building. For instance, the sheaves may be mounted on davits, making it possible to reach the roof level more easily especially if parapets need to be cleared. If desired, the davits could be folded out of sight, and the tension in the wire rope used to automatically erect them. In addition, openings in the parapets may be provided for rigging tiebacks.

The frame holding the sheaves may be hung over the side of the building, and may rest against the building face. The sheaves may also be mounted on outriggers that project from the roof, or from lower elevations. These outriggers may be rigidly affixed, or less obtrusively arranged to slide outward when tension is applied to the wire rope. A preferred installation for the purposes of the Fire Department may be to have one or two davits that are high enough to permit easy access to the roof level.

According to an embodiment of the invention, instructions may be provided to operate a system for reaching from outside an upper floor of a multi-story building, as described above with reference to one or more of FIGS. 1-10. These instructions may be provided to, for example, Fire Department personnel whose workers will be responding to an emergency call regarding the building.

To summarize, various embodiments of a method and system for accessing an upper floor of a multi-story building from the outside have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, instead of or in addition to a container, a fire hose or electrical power cable may be attached to the container or the cable, so that the length of fire hose or cable is hoisted from a pumper or powered reel to the upper floor. In addition, the system may also be used in non-emergency situations, e.g. lifting or lowering heavy or bulky loads that do not fit into building elevators or may cause inconveniences for the tenants; and during construction modifications to avoid shifting long operations to nights or weekends. Also, some of the techniques described above in relation to buildings may be applied to certain other tall structures such as windmills and off-shore oil platforms. The specification and drawings are, accordingly, to be regarded in an illustrative rather than a restrictive sense.

What is claimed is:

1. A system comprising:
   a first fixed pulley attached to a non-portable structure;
   a second fixed pulley attached to a base of the structure below the first fixed pulley;
   a moveable pulley;
   a closed loop of cable installed around the first fixed pulley and the moveable pulley;
   a load attached to the loop;
   a traction winch around which the loop is operatively installed to lift the attached load;
   a cable connected to the moveable pulley and trained around the second fixed pulley, the cable operatively controlled to (i) draw the moveable pulley toward a side of the structure, thereby increasing tension in the loop so that the load, suspended by the loop, moves away from the side of the structure and (ii) allow the moveable pulley to move away from the side of the structure, thereby decreasing tension in the loop so that the suspended load moves toward the side of the structure.

2. The system of claim 1 wherein the winch is mounted on a vehicle.

3. The system of claim 1 wherein the winch is breech loadable.

4. The system of claim 1 wherein the first fixed pulley is attached proximate to a roof of the structure.

5. The system of claim 1 wherein the load is attached to a near section of the loop,
   wherein a far section of the loop, when the loop has been installed on the traction winch, is positioned farther from a side of the structure than the near section.

6. The system of claim 5 wherein the traction winch uses power and braking to directly act upon the far section of the loop, wherein power is used to pull in the far section and thereby lift said container and braking is used to let out the far section to thereby lower said container.

* * * * *